United States Patent [19]
Kanenwischer

[11] Patent Number: 5,749,452
[45] Date of Patent: May 12, 1998

[54] MOBILE CONVEYOR INCLUDING ALIGNMENT SYSTEM

[75] Inventor: Bryon M. Kanenwischer, Spokane, Wash.

[73] Assignee: R.A. Hanson Company, Inc., Spokane, Wash.

[21] Appl. No.: 508,125

[22] Filed: Jul. 27, 1995

[51] Int. Cl.$^6$ ................................................ B65G 43/00
[52] U.S. Cl. ...................... 198/301; 198/304; 198/316.1; 198/571; 198/587
[58] Field of Search .................... 198/301, 304, 198/316.1, 571, 587

[56] References Cited

U.S. PATENT DOCUMENTS

| | | |
|---|---|---|
| Re. 26,826 | 3/1970 | Nolan . |
| 3,361,248 | 1/1968 | Daymon . |
| 3,422,949 | 1/1969 | Bankauf et al. .............. 198/304 X |
| 3,604,121 | 9/1971 | Hull . |
| 3,621,978 | 11/1971 | Smith . |
| 3,889,796 | 6/1975 | Baily et al. . |
| 3,897,640 | 8/1975 | Swisher, Jr. et al. . |
| 3,987,890 | 10/1976 | Merritt .............. 198/316.1 |
| 4,031,997 | 6/1977 | Nelson . |
| 4,034,778 | 7/1977 | Sage et al. . |
| 4,089,403 | 5/1978 | Freed, Jr. et al. ............ 198/316.1 |
| 4,090,601 | 5/1978 | Freed, Jr. ................... 198/316.1 |
| 4,095,475 | 6/1978 | Buckley . |
| 4,120,093 | 10/1978 | Spies . |
| 4,206,840 | 6/1980 | Hanson .................. 198/301 |
| 4,361,219 | 11/1982 | Aldridge et al. ............. 198/587 X |
| 4,442,512 | 4/1984 | Kodera et al. . |
| 4,627,170 | 12/1986 | McKechnie . |
| 4,661,933 | 4/1987 | Seeman et al. . |
| 4,706,227 | 11/1987 | DeVall et al. . |
| 4,709,485 | 12/1987 | Bowman . |
| 4,747,454 | 5/1988 | Perryman . |
| 4,844,681 | 7/1989 | Pierre et al. . |
| 4,907,881 | 3/1990 | Jones . |
| 5,056,237 | 10/1991 | Saunders . |
| 5,077,905 | 1/1992 | Murray, Jr. . |
| 5,084,980 | 2/1992 | Skopec et al. . |
| 5,145,235 | 9/1992 | Smart . |
| 5,185,937 | 2/1993 | Piety et al. . |
| 5,233,761 | 8/1993 | Guaraldi et al. . |
| 5,299,674 | 4/1994 | Cusitar . |

FOREIGN PATENT DOCUMENTS 56-161207  11/1981  Japan .

OTHER PUBLICATIONS

Contaq Technologies Corporation — "Ultrasonic Level Measurement Products", Model ISU 100/ISU800/ISU1000 (No Date).

Contaq Technologies Corporation— "Ultrasonic Distance Measurement Products", Model UDM–FL Product Brochures (No Date).

*Primary Examiner*—D. Glenn Dayoan
*Attorney, Agent, or Firm*—Wells, St. John, Roberts, Gregory & Matkin, P.S.

[57] ABSTRACT

An articulated apparatus including a first section having first and second ends, and a length between the first and second ends; a second section having first and second ends, and a length between the first and second ends; a joint connecting the second end of the first section to the first end of the second section for pivotal movement about a first axis; and a cylinder/piston assembly having a piston connected to the first section and movable with the first conveyor section, and having a cylinder mounted to the second section and movable with the second section, the piston being slidably received in the cylinder, and a transmitter and a receiver capable of determining the location of the piston in the cylinder, the transmitter and receiver being located within the cylinder.

19 Claims, 9 Drawing Sheets

MOBILE CONVEYOR INCLUDING ALIGNMENT SYSTEM

TECHNICAL FIELD

This invention relates to articulated mobile conveyors. More particularly, the invention relates to an articulated mobile conveyor including a system for aligning articulated sections of the mobile conveyor with one another.

BACKGROUND OF THE INVENTION

Articulated mobile conveyors are used for various purposes, such as in mining, or in agricultural harvesting. For example, the conveyors can be used for excavating, stacking, or reclaiming material such as ore, coal, granite, clay, salt, potash, or other bulk material. The mobile conveyors include articulated sections. The sections are joined to one another using, for example, ball joints. This enables rotational translation of one section relative to another in view of grade changes in the ground over which the sections lie. This also provides flexibility between segments when the conveyor is moved. Each section supports an endless loop belt which transports material over the length of the conveyor. Each section is separately movable relative to the ground and includes, for example, wheels or tracks in contact with the ground below the section. Each section has its own drive motor for moving the section relative to the ground. Thus, the entire conveyor can be moved or transported, such as when it is desired to harvest or mine in a different location, or when it is desired to transversely move the conveyor as material is stripped away from the surface of the earth or is moved from large storage piles. For examples of such articulated mobile conveyor, see the following patents which are incorporated herein by reference: U.S. Pat. No. 4,206,840 to Hanson; U.S. Pat. No. 4,031,997 to Nelson; and U.S. Pat. No. 3,361,248 to Daymon.

While moving the conveyor relative to the ground, it may be desirable to longitudinally align two or more adjacent sections. See, for example, U.S. Pat. No. 3,422,949 to Bankauf. Bankauf discloses a guide follower which, upon too much misalignment, activates a hydraulic system to cause steerable wheels to turn.

After moving the conveyor, it may be desirable to align two or more adjacent sections relative to one another such that the endless belts extend along a straight line in a common vertical plane, such as for better belt training from one section to the next. Prior art mechanisms typically employ a series of pulleys and cables connected to each adjoining section for determining when precise longitudinal alignment has been reached. U.S. Pat. No. 3,897,640 to Swisher, Jr. et al. discloses a conveyor including an alignment switch and a sensor connected to the alignment switch for correctingly moving the conveyor to maintain the position of the conveyor at a predetermined alignment position, and is incorporated herein by reference.

BRIEF DESCRIPTION OF THE DRAWINGS

Preferred embodiments of the invention are described below with reference to the following accompanying drawings.

FIG. 8 is a sectional view showing the internal structure of the cylinder/piston assembly of FIG. 4.

FIG. 9 is an enlarged sectional view showing a bearing and sealing arrangement in the cylinder/piston assembly of FIG. 4.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention provides an articulated mobile conveyor which is movable relative to the ground, the conveyor comprising a first conveyor section including a frame having first and second ends, and a length between the first and second ends, the frame being supported from the ground for movement relative to the ground in at least a direction transverse to the length; a second conveyor section including a frame having first and second ends, and a length between the first and second ends, the frame of the second conveyor section being supported from the ground for movement relative to the ground in at least a direction transverse to the length of the second conveyor section; a joint connecting the second end of the first conveyor section to the first end of the second conveyor section for pivotal movement about a first axis; and a cylinder/piston assembly having a piston connected to the first conveyor section and movable with the first conveyor section, having a cylinder mounted to the second conveyor section and movable with the second conveyor section, the piston being slidably received in the cylinder, and a transmitter and a receiver capable of determining the location of the piston in the cylinder, the transmitter and receiver being located within the cylinder.

One aspect of the invention provides an articulated mobile conveyor which is movable relative to the ground, the conveyor comprising a first conveyor section including first and second ends, means for conveying material between the first and second ends, means for moving the section relative to the ground, and a length between the first and second ends; a second conveyor section including first and second ends, means for conveying material between the first and second ends of the second conveyor section, means for moving the second section relative to the ground, and a length between the first and second ends of the second conveyor section; means connecting the second end of the first conveyor to the first end of the second conveyor for pivotal movement about a first axis; and means for aligning the first conveyor section with the second conveyor section, such that the length of the first conveyor section is parallel to the length of the second conveyor section, the aligning means including a cylinder/piston assembly having a piston supported by the first conveyor section, and a cylinder supported by the second conveyor section, the piston being slidably received in the cylinder, and the aligning means further including means, including a transmitter, for determining the location of the piston in the cylinder.

Another aspect of the invention provides an articulated conveyor comprising a first conveyor section including first and second ends; a second conveyor section including first and second ends; a joint connecting the second end of the first conveyor section to the first end of the second conveyor section; and an aligner selectively aligning the first conveyor section with the second conveyor section, the aligner including an ultrasonic transmitter.

Another aspect of the invention provides an articulated apparatus comprising a first section having first and second ends, and a length between the first and second ends; a second section having first and second ends, and a length between the first and second ends; a joint connecting the second end of the first section to the first end of the second section for pivotal movement about a first axis; and a cylinder/piston assembly having a piston connected to the first section and movable with the first conveyor section, and having a cylinder mounted to the second section and movable with the second section, the piston being slidably received in the cylinder, and a transmitter and a receiver capable of determining the location of the piston in the cylinder, the transmitter and receiver being located within the cylinder.

Another aspect of the invention provides an apparatus for measuring length, the apparatus comprising a cylinder; a piston slidably received in the cylinder; an ultrasonic transmitter in the cylinder; and an ultrasonic receiver in the cylinder, the receiver cooperating with the transmitter to determine the location of the piston in the cylinder.

Shown in the various figures is an articulated mobile conveyor 10 which embodies the invention. The conveyor 10 includes a first conveyor section 12. The first conveyor section 12 includes a frame 14 having first and second ends 16 and 18, and a length L1 between the first and second ends 16 and 18. The frame 14 is supported from the ground 20 for movement relative to the ground 20 in at least a direction transverse to the length of the first conveyor section 12. More particularly, in the illustrated embodiment, the first conveyor section 12 comprises wheels 22 supporting the frame 14 from the ground 20, and a motors 24 selectively driving the wheels 22 to move the conveyor section 12 over the ground 20. The wheels 22 are preferably steerable. Endless tracks or other arrangements can be employed instead of the wheels 22.

The conveyor 10 further includes a second conveyor section 26 which is similar to the first conveyor section 12. The second conveyor section 26 includes a frame 28 having first and second ends 30 and 32, and a length L2 between the first and second ends. The frame of the second conveyor section 26 is supported from the ground 20 for movement relative to the ground 20 in at least a direction transverse to the length L2 of the second conveyor section 26. More particularly, in the illustrated embodiment, the second conveyor section 26 comprises wheels 34 supporting the frame 28 from the ground 20, and a motor 36 selectively driving the wheels 34 to move the conveyor section 26 over the ground 20. The conveyor 10 further includes additional conveyor sections (not shown).

Figure 1:
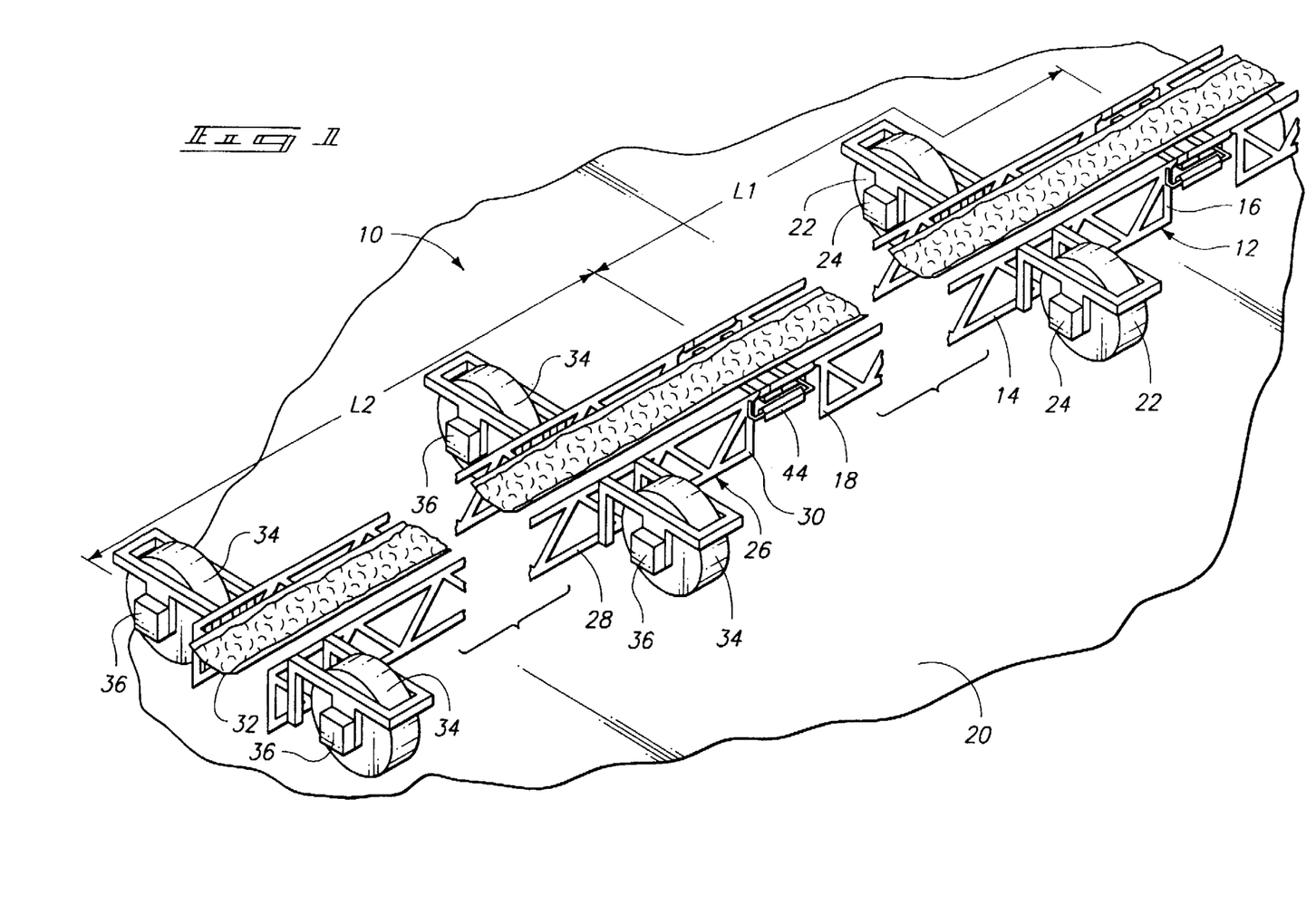
FIG. 1 is a perspective view of a conveyor embodying the invention and including adjacent sections having ends connected together, and including a cylinder/piston assembly.
Figure 2:
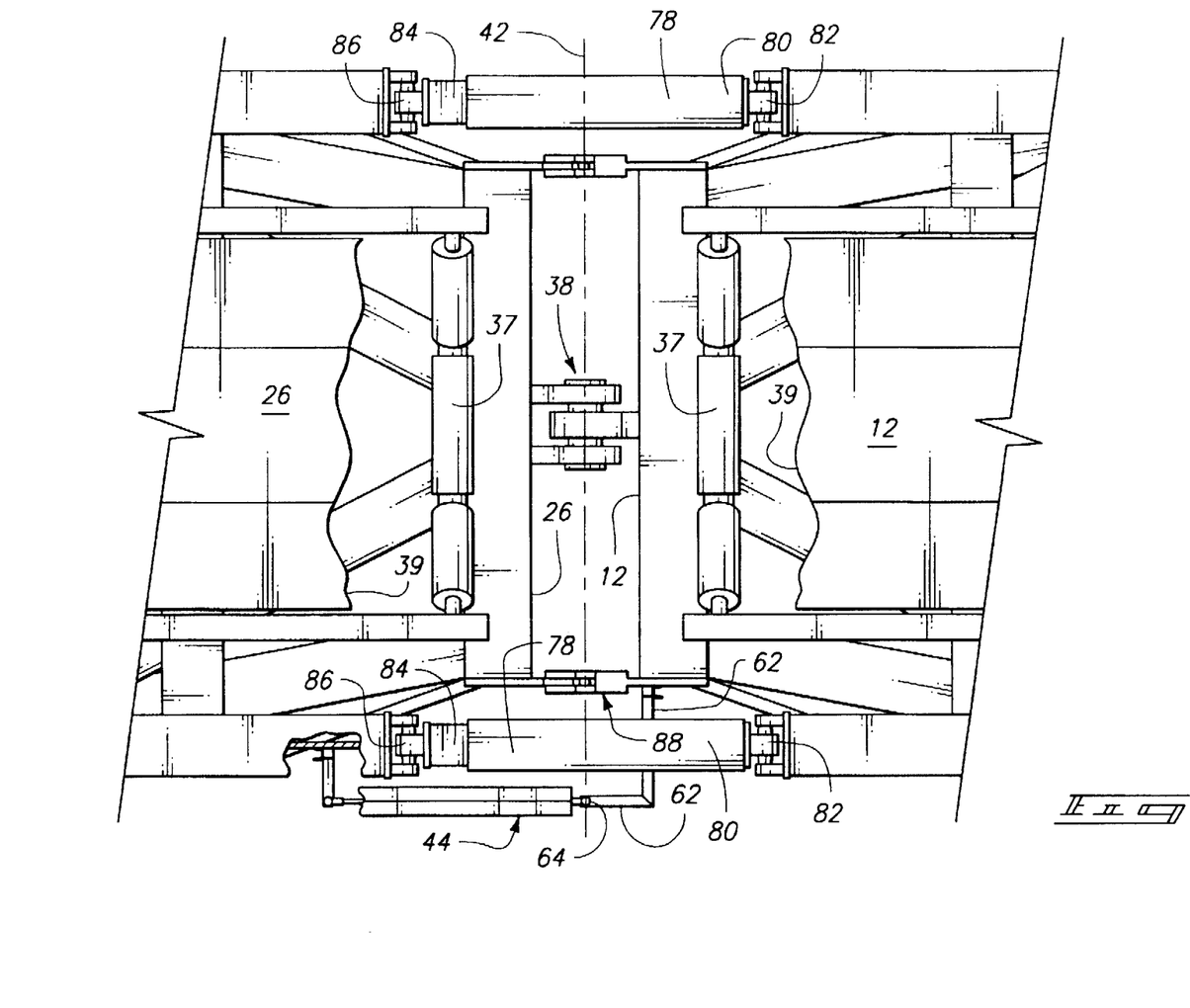
FIG. 2 is a top plan view showing the connected ends of the adjacent sections of the conveyor of FIG. 1 and showing the cylinder/piston assembly.

The conveyor 10 further includes rollers 37 included in each conveyor section, and a material carrying flexible member 39, such as a belt, supported by the rollers 37 (FIG. 2). The conveyor includes an appropriate drive means or motor (not shown) for driving the flexible member 39 around a loop defined by the combined length of joined conveyor sections. The conveyor 10 includes a joint 38 (FIG. 2) connecting the second end 18 of the first conveyor section 12 to the first end 30 of the second conveyor section 26 for pivotal movement about an axis 40 (FIG. 3) which is a vertical axis if the conveyor is on even ground. In the illustrated embodiment, the joint 38 is a ball joint which further provides for pivotal movement about an axis 42 (FIG. 2) which is a horizontal axis when the conveyor 10 is on level ground.

Figure 3:
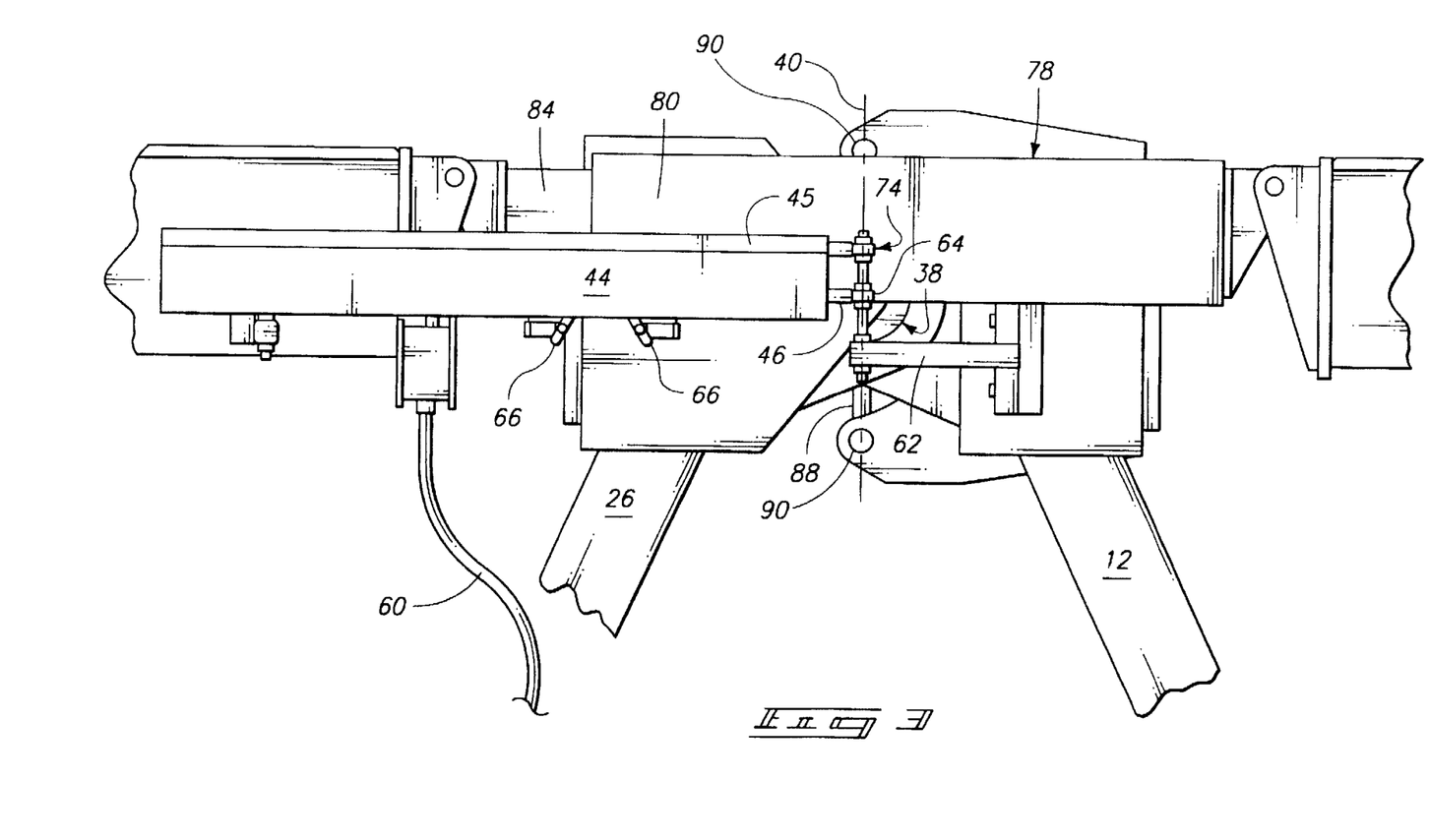
FIG. 3 is a side elevational view showing the connected ends of the adjacent sections of the conveyor of FIG. 1 and showing the cylinder/piston assembly.

The conveyor 10 further includes an aligner or means for aligning the first conveyor section with the second conveyor section, such that the length of the first conveyor section is parallel to the length of the second conveyor section. While other means could be employed, the illustrated aligning means comprises a cylinder/piston assembly 44 having a piston 46 connected to the first conveyor section 12 and movable with the first conveyor section 12 (FIG. 3). The cylinder/piston assembly 44 further has a cylinder 48 (FIG. 8) mounted to the second conveyor section 26 with mounting hardware 49 (FIG. 3), and movable with the second conveyor section 26. The conveyor 10 includes a cover 45 covering the cylinder/piston assembly 44, and the mounting hardware 49 includes a roller 47 supporting one end of the cover 45. The piston 46 is slidably received in the cylinder 48. The piston 46 is movable within the cylinder 48 along an axis 50. The axis 50 extends between securing points defined by the mounting hardware 49 and a pivot 64 (described below in more detail). The cylinder 48 includes an endwall 52, and the piston 46 has a head 54 which moves toward and away from the endwall 52 to define a variable volume chamber 56 between the piston head 54 and the cylinder endwall 52.

The aligning means further comprises an ultrasonic transmitter and an ultrasonic receiver located within the cylinder. The transmitter and receiver are capable of determining the location of the piston 46 in the cylinder 48. The transmitter is located in the chamber at the endwall 52, and the transmitter is mounted to transmit a signal against the piston head. The receiver is mounted to receive the signal after it is reflected from the piston head. The aligning means further comprises a timer connected to the transmitter and receiver. The timer calculates the amount of time for the signal to travel from the transmitter to the receiver, the signal being reflected from the piston head to the receiver.

In one embodiment of the invention, the transmitter, receiver, and timer are all comprised by an integrated contactless distance measuring device or proximity sensor 58. In one embodiment, the integrated measurement device 58 is a model sold by Contaq Technologies Corporation, 15 Main Street, Bristol, Vt. 05443, such as the Model UDM-FL, or the "ISU Series". Various other integrated measurement devices could be employed.

The cylinder/piston assembly 44 further includes sealing and bearing structure 92 at an end of the cylinder opposite the endwall 52. This structure guide the piston 46, and includes bearings 94, and an O-ring 96.

Figure 10:
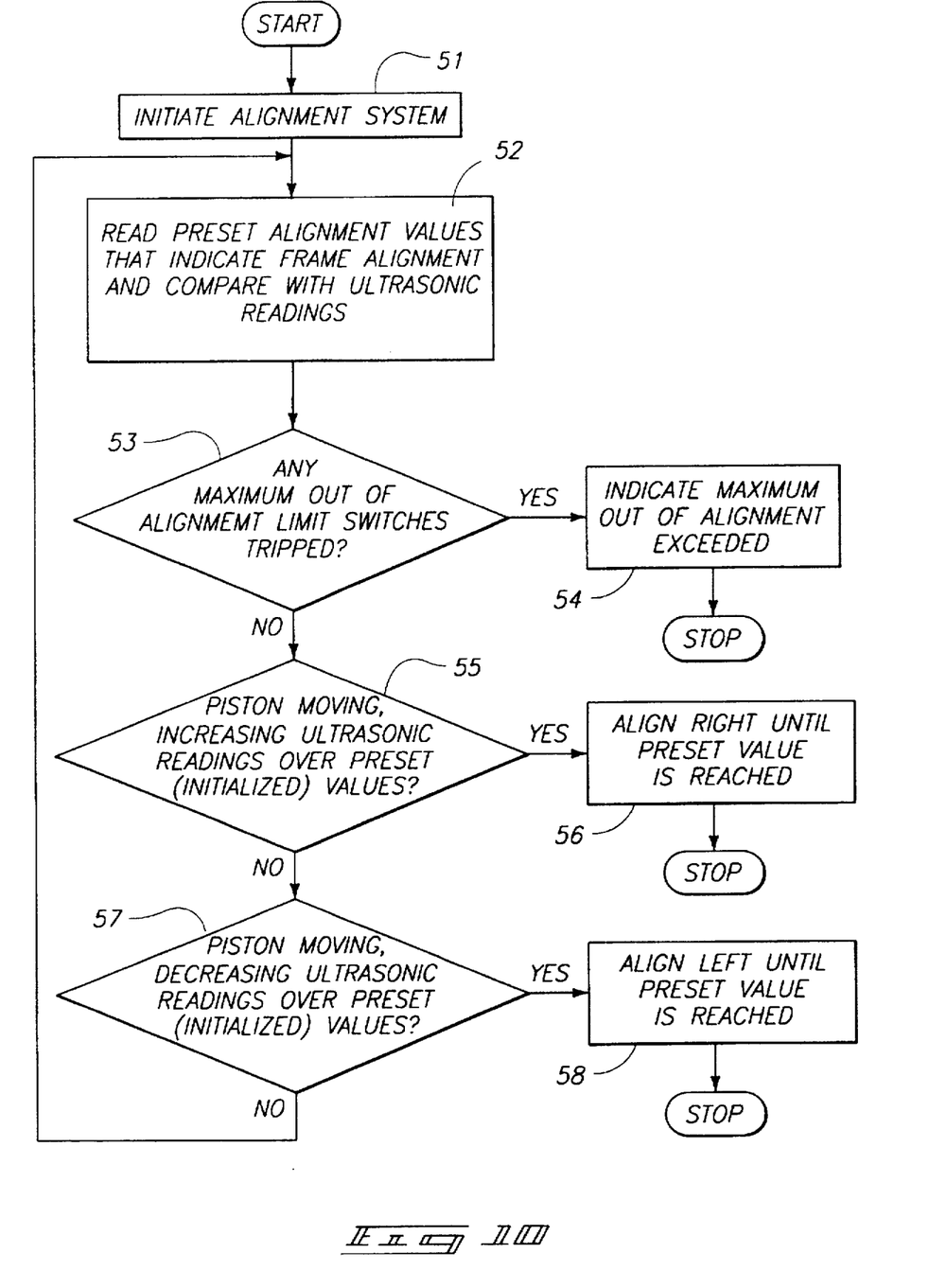
FIG. 10 is a flowchart illustrating logic performed by a control system included in the conveyor of FIG. 1.
Figure 11:
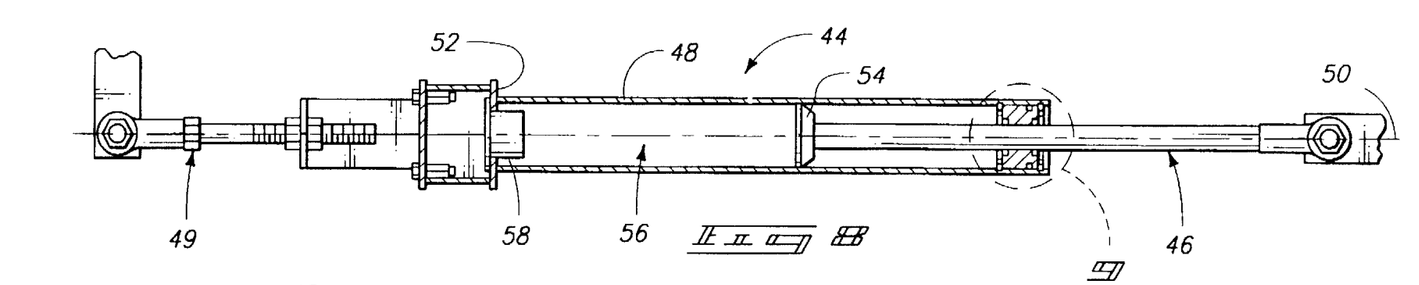
Figure 12:
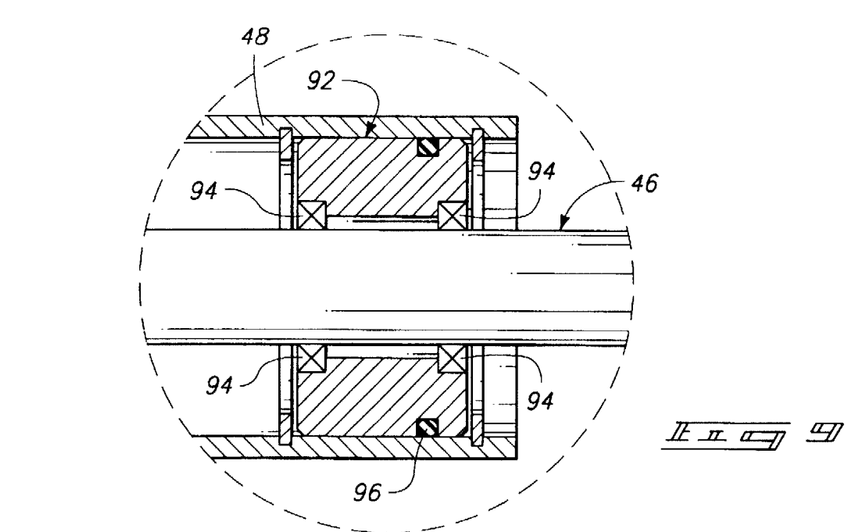

The measuring device 58 provides a distance signal, via cable 60, which indicates the extent of the piston 46 within the cylinder 48, and therefore the extent of misalignment. The first and second conveyor sections 12 and 26 can then be either manually or automatically moved until the extent of the piston within the cylinder is equal, within tolerance, to a predetermined extent of the piston 46 within the cylinder 48. The predetermined extent corresponds to the first and second conveyor sections 12 and 26 being aligned. In the illustrated embodiment, a conventional control system (not shown) moves the first and second conveyor sections 12 and 26 into alignment, by operating the motors 24 and 36, based on the distance signal generated by the measuring device 58. In the illustrated embodiment, the control system comprises a PLC. The control system performs logic as illustrated in FIG. 10, that will be described below.

The conveyor 10 includes a support 62 connecting the piston/cylinder assembly 44 to the first conveyor section 12. The support 62 includes a pivot 64 providing for pivotal movement about an axis in the same horizontal plane as the joint 38. More particularly, the pivot 64 provides for pivotal movement about the axis 42. In the illustrated embodiment, the pivot 64 is a spherical joint. This enables the conveyor sections 12 and 26 to pivot about the joint 38, and the pivot 64 thereby accommodates differences in terrain over which the conveyor sections 12 and 26 are located without impacting on the aligner. For example, if the section 12 was raised in the view shown in FIG. 3, the pivot 64 will permit pivoting about the axis 42, and the cover 45 would move to the left over roller 47.

Figure 4:
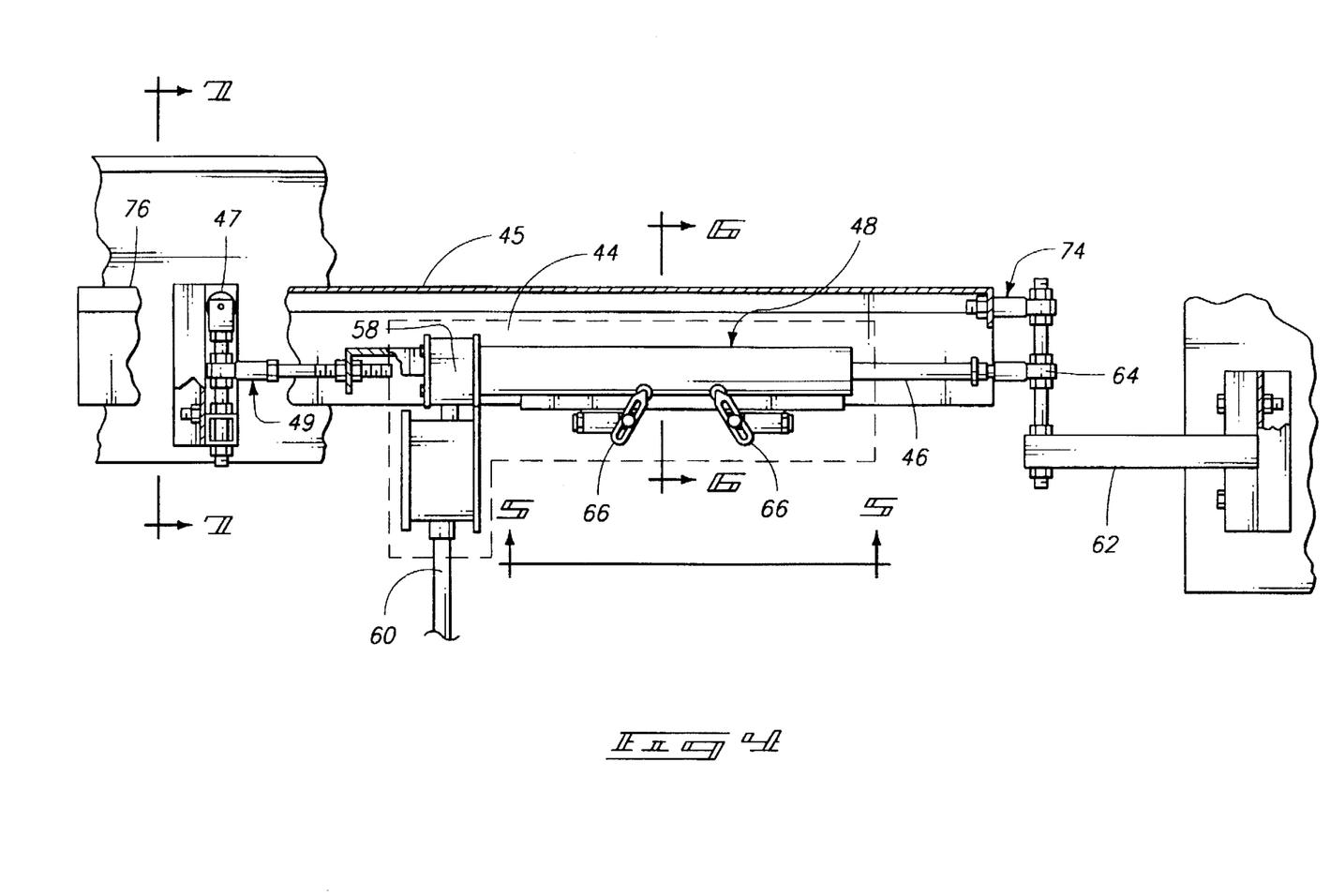
FIG. 4 is an enlarged side elevational view showing the cylinder/piston assembly of FIG. 1 with a cover of the cylinder/piston assembly broken away.
Figure 5:
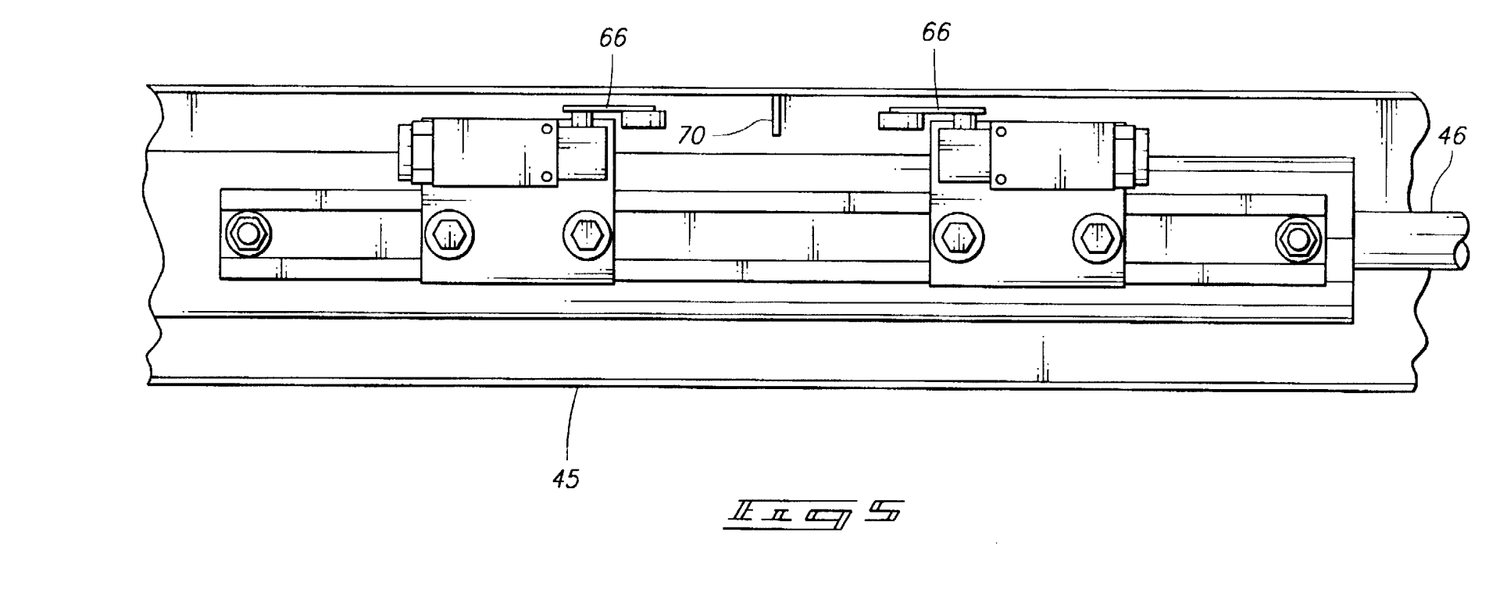
FIG. 5 is a view taken along line 5–5 of FIG. 4, and is a bottom view of the cylinder/piston assembly of FIG. 4.
Figure 6:
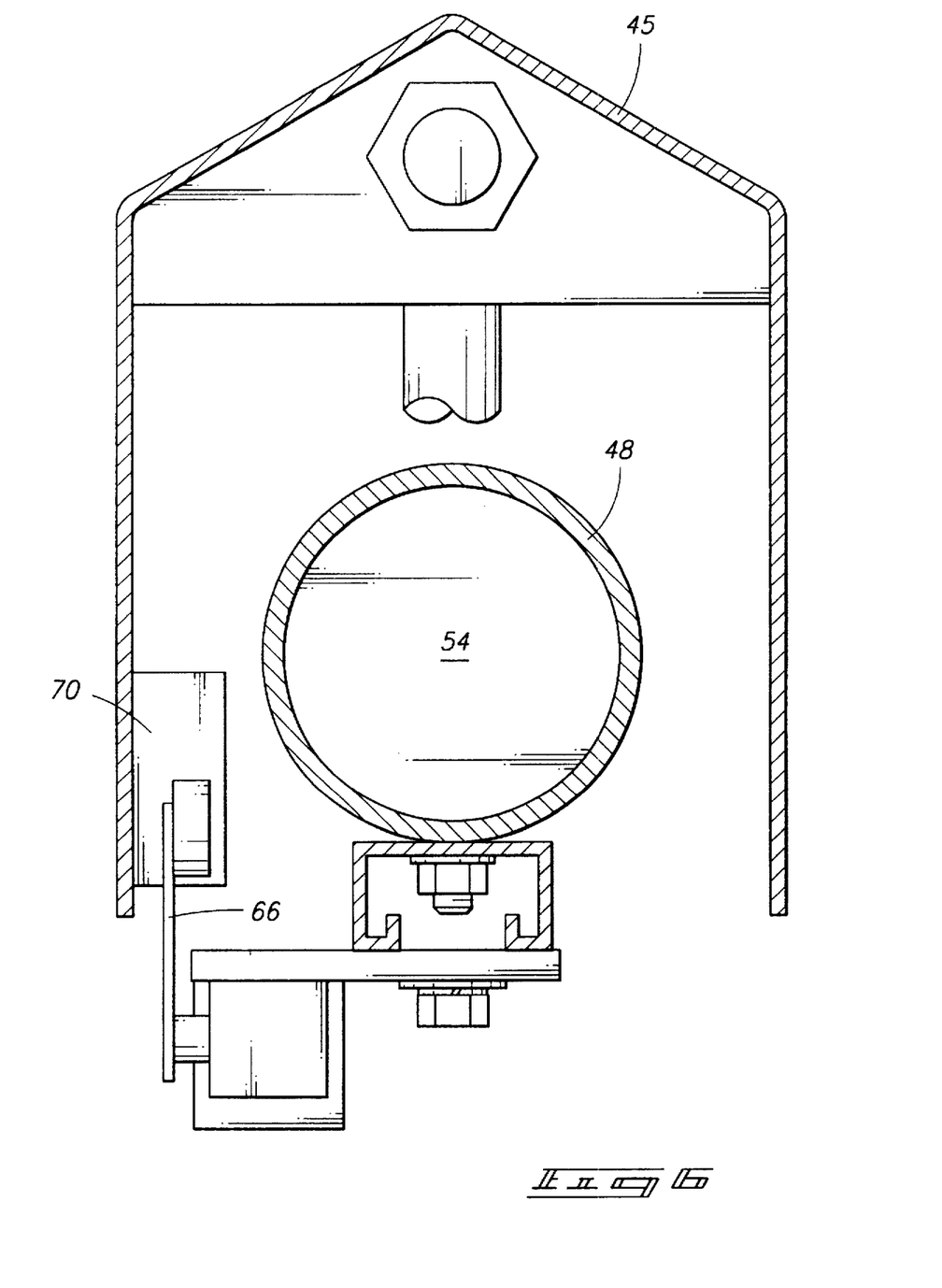
FIG. 6 is a sectional view along line 6–6 of FIG. 4.
Figure 7:
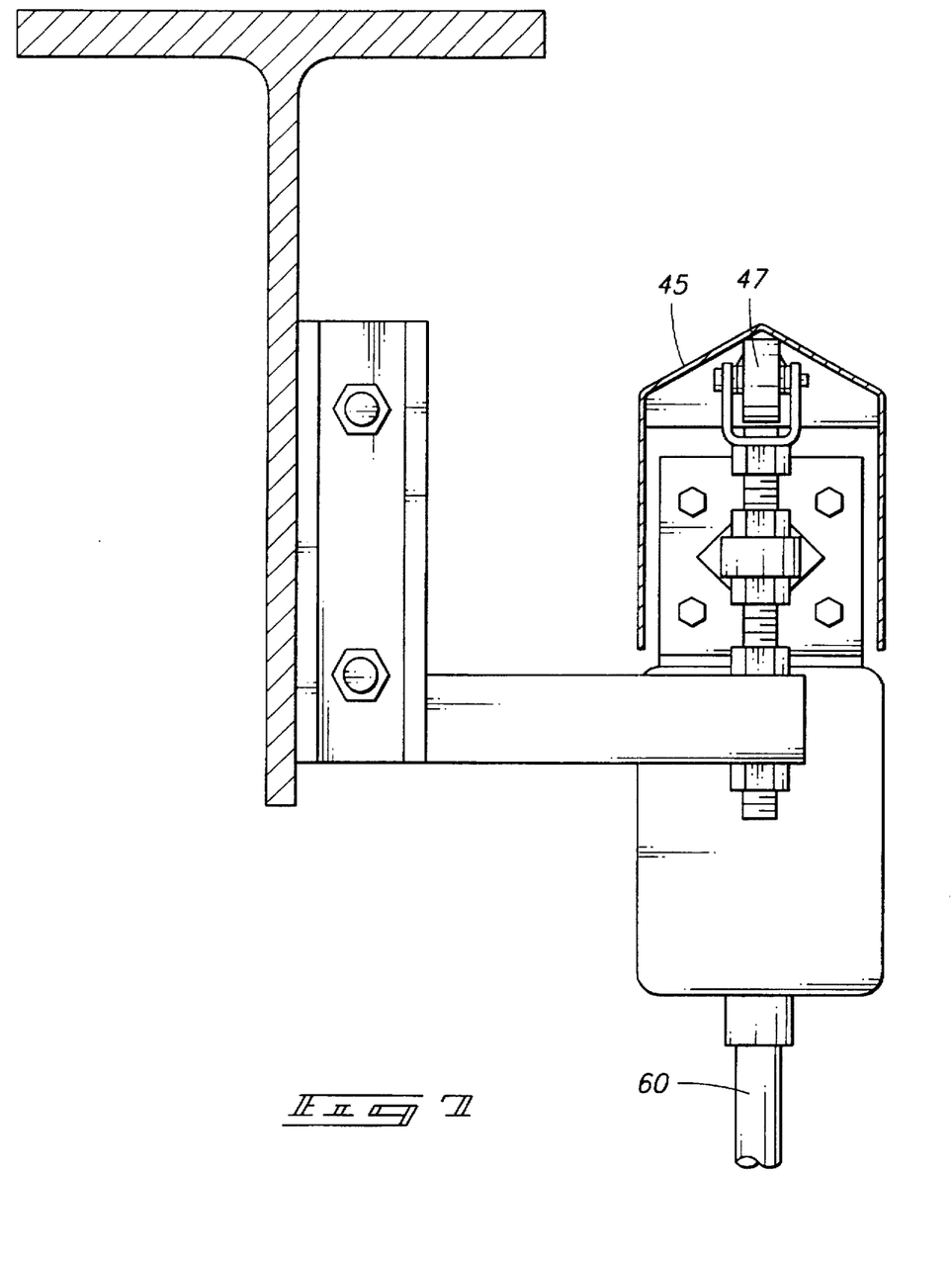
FIG. 7 is a sectional view along line 7–7 of FIG. 4.

The conveyor 10 further includes maximum out of alignment limit switches 66. If either of these switches engages wall 70 of the cover 45 (FIG. 5), the control system will shut down the conveyer 10, and the belt 39 will not operate. As shown in FIGS. 3 and 4, the cover 45 has an end 72 which is fixed against movement in a horizontal direction relative to the support 62, by connecting hardware 74, to the support 62, and has an opposite end 76 which rides on roller 47 and is free to move in the horizontal direction.

The conveyor 10 further includes parallel, spaced apart, tripper bridge assemblies 78 (FIG. 2). Each tripper bridge assembly 78 includes a hollow, elongated piece 80 having an end 82 connected to section 12 for rotation about a horizontal axis, and includes an elongated piece 84 telescopically received in the piece 80 and having an end 86 connected to section 26 for rotation about a horizontal axis. The tripper bridge assemblies 78 provide for axial displacement, but enhance structural integrity of the conveyor The conveyor 10 further includes dog legs 88. The dogs legs 88 each have one end connected to the section 12 and another end connected to the section 26 via spherical rod ends 90. The dog legs 88 are structural members which transmit torsion between sections 26 and 12. The allow for plan view deflection while maintaining torsional rigidity.

The logic performed by the control system is shown in FIG. 10.

In step S1, the alignment system (aligner) is initiated. After performing step S1, the control system proceeds to step S2.

In step S2, the control system reads pre-set (predetermined desired) alignment values that indicate frame alignment and compares these alignment values with ultrasonic readings (readings from sensors 58 indicating actual alignment condition). After performing step S2, the control system proceeds to step S3.

In step S3, the control system determines whether any of the limit switches 66 have been tripped. If so, the control system proceeds to step S4. If not, the control system proceeds to step S5.

In step S4, the control system indicates to an operator (e.g., visually or audibly) that the conveyor is out of alignment by more than a maximum amount, and stops executing.

In step S5, the control system determines whether the piston 46 is moving such that readings of the sensor 58 are increasing over the pre-set (initialized) values measured in step S2. If so, the control system proceeds to step S6. If not, the control system proceeds to step S7.

At step S6, the control system causes the conveyor sections 12 and 26 to pivot right relative to one another (about axis 40), so as to move toward the pre-set values, until the pre-set values are reached. After performing step S6, alignment is complete, and the control system terminates alignment activity.

In step S7, the control system determines whether the piston 46 is moving such that readings of the sensor 58 are decreasing over the pre-set (initialized) values measured in step S2. If so, the control system proceeds to step S8. If not, the control system proceeds to step S2.

At step S8, the control system causes the conveyor sections 12 and 26 to pivot left relative to one another (about axis 40), so as to move toward the pre-set values, until the pre-set values are reached. After performing step S8, alignment is complete and the control system terminates alignment activity.

Thus, a conveyor has been disclosed which includes a system for aligning adjacent sections without the need for a complicated mechanism, such as a mechanism having a series of pulleys and cables.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An articulated mobile conveyor which is movable relative to the ground, the conveyor comprising:

a first conveyor section including a frame having first and second ends, and a length between the first and second ends, the frame being supported from the ground for movement relative to the ground in at least a direction transverse to the length;

a second conveyor section including a frame having first and second ends, and a length between the first and second ends, the frame of the second conveyor section being supported from the ground for movement relative to the ground in at least a direction transverse to the length of the second conveyor section;

a joint connecting the second end of the first conveyor section to the first end of the second conveyor section for pivotal movement about a first axis; and a cylinder/piston assembly having a piston connected to the first conveyor section and movable with the first conveyor section, having a cylinder mounted to the second conveyor section and movable with the second conveyor section, the piston being slidably received in the cylinder, and a transmitter and a receiver capable of determining the location of the piston in the cylinder, the transmitter and receiver being located within the cylinder.

2. An articulated mobile conveyor in accordance with claim 1 wherein the piston is movable within the cylinder along a second axis that is perpendicular to the first axis.

3. An articulated mobile conveyor in accordance with claim 1 wherein the first axis is a vertical axis.

4. An articulated mobile conveyor in accordance with claim 1 wherein the joint connecting the second end of the first conveyor section to the first end of the second conveyor section is a ball joint which further provides for pivotal movement about at least a third, horizontal, axis.

5. An articulated mobile conveyor in accordance with claim 4 and further comprising a support connecting the piston/cylinder assembly to the first conveyor section, the support including a pivot providing for pivotal movement about the third axis, thereby accommodating differences in terrain over which the first and second conveyor sections are located.

6. An articulated mobile conveyor in accordance with claim 1 wherein the transmitter is an ultrasonic transmitter.

7. An articulated mobile conveyor in accordance with claim 1 wherein the cylinder includes an endwall, wherein the piston has a head which moves toward and away from the endwall to define a variable volume chamber between the piston head and the cylinder endwall, wherein the transmitter is located in the chamber at the endwall, and wherein the transmitter is mounted to transmit a signal against the piston head.

8. An articulated mobile conveyor in accordance with claim 7, wherein the receiver is mounted to receive the signal after it is reflected from the piston head, and further comprising a timer connected to the transmitter and receiver and to calculate the amount of time for the signal to be reflected from the piston head to the receiver.

9. An articulated mobile conveyor in accordance with claim 8 and further comprising circuitry connected to the timer for determining an amount of misalignment based on the calculated amount of time.

10. An articulated mobile conveyor which is movable relative to the ground, the conveyor comprising:

a first conveyor section including first and second ends, means for conveying material between the first and second ends, means for moving the section relative to the ground, and a length between the first and second ends;

a second conveyor section including first and second ends, means for conveying material between the first and second ends of the second conveyor section, means for moving the second section relative to the ground, and a length between the first and second ends of the second conveyor section;

means connecting the second end of the first conveyor to the first end of the second conveyor for pivotal movement about a first axis; and means for aligning the first conveyor section with the second conveyor section, such that the length of the first conveyor section is parallel to the length of the second conveyor section, the aligning means including a cylinder/piston assembly having a piston supported by the first conveyor section, and a cylinder supported by the second conveyor section, the piston being slidably received in the cylinder, and the aligning means further including means, including a transmitter, for determining the location of the piston in the cylinder.

11. An articulated mobile conveyor in accordance with claim 10 wherein the piston is movable within the cylinder along a second axis that is perpendicular to the first axis.

12. An articulated mobile conveyor in accordance with claim 10 wherein the first axis is a vertical axis.

13. An articulated mobile conveyor in accordance with claim 10 wherein the means connecting the second end of the first conveyor to the first end of the second conveyor further provides for pivotal movement about at least a third, horizontal axis.

14. An articulated mobile conveyor in accordance with claim 13 and further comprising a support connecting the piston/cylinder assembly to the first conveyor section, the support including a pivot providing for pivotal movement about the third axis.

15. An articulated mobile conveyor in accordance with claim 10 wherein the transmitter is an ultrasonic transmitter.

16. An articulated mobile conveyor in accordance with claim 10 wherein the piston has a piston head, and wherein the transmitter is mounted to transmit a signal against the piston head.

17. An articulated mobile conveyor in accordance with claim 16 and further comprising a receiver in the cylinder, wherein the receiver is mounted to receive the signal after it is reflected from the piston head, and further comprising means for calculating the amount of time for the signal to be reflected from the piston head to the receiver.

18. An articulated mobile conveyor in accordance with claim 17 and further comprising means for determining an amount of misalignment based on the calculated amount of time.

19. An articulated conveyor comprising:

a first conveyor section including first and second ends;

a second conveyor section including first and second ends;

a joint connecting the second end of the first conveyor section to the first end of the second conveyor section; and an aligner selectively aligning the first conveyor section with the second conveyor section, the aligner including an ultrasonic transmitter.

* * * * *